United States Patent
Kim

(10) Patent No.: US 8,189,554 B2
(45) Date of Patent: May 29, 2012

(54) METHOD FOR TRANSMITTING AND RECEIVING DATA USING BEACON SCHEDULING IN WIRELESS SENSOR NETWORK

(75) Inventor: Eui-Jik Kim, Suwon-si (KR)

(73) Assignee: Samsung Electronics Co., Ltd., Maetan-dong, Yeongtong-gu, Suwon-si, Gyeonggi-do (KR)

( * ) Notice: Subject to any disclaimer, the term of this patent is extended or adjusted under 35 U.S.C. 154(b) by 1105 days.

(21) Appl. No.: 12/077,574

(22) Filed: Mar. 20, 2008

(65) Prior Publication Data

US 2009/0016314 A1    Jan. 15, 2009

(30) Foreign Application Priority Data

Jul. 10, 2007    (KR) .......................... 10-2007-0069213

(51) Int. Cl.
*H04J 3/00*    (2006.01)

(52) U.S. Cl. ..................... 370/345; 370/458; 455/450

(58) Field of Classification Search ................. 370/343, 370/345, 458; 455/450
See application file for complete search history.

(56) References Cited

U.S. PATENT DOCUMENTS

| | | | |
|---|---|---|---|
| 2005/0171662 A1* | 8/2005 | Strege et al. | 701/33 |
| 2006/0040701 A1* | 2/2006 | Long et al. | 455/525 |
| 2008/0212525 A1* | 9/2008 | Tervonen et al. | 370/329 |

\* cited by examiner

*Primary Examiner* — Sai-Ming Chan
(74) *Attorney, Agent, or Firm* — Cha & Reiter, LLC

(57) ABSTRACT

A method for generating a superframe structure by using a beacon scheduling within a wireless sensor network and transmitting data based on the generated superframe structure includes: defining, by each of a plurality of data transceivers in the network, a relation with data transceivers located in their vicinity; assigning a data transceiver for beacon transmission/reception to each slot of a superframe in consideration of the defined relation; generating a superframe structure including a Beacon Only Period (BOP) and a data frame transmission period, in consideration of assigned slots; and broadcasting beacons and data frames in consideration of the superframe structure.

20 Claims, 10 Drawing Sheets

METHOD FOR TRANSMITTING AND RECEIVING DATA USING BEACON SCHEDULING IN WIRELESS SENSOR NETWORK

CLAIM OF PRIORITY

This application claims the benefit of the earlier filing date, under 35 U.S.C. §119(a), to that patent application entitled "Method for Transmitting and Receiving Data using Beacon Scheduling in Wireless Sensor Network," filed in the Korean Intellectual Property Office on Jul. 10, 2007 and assigned Serial No. 2007-69213, the contents of which are hereby incorporated by reference.

BACKGROUND OF THE INVENTION

1. Field of the Invention

The present invention relates to a wireless sensor network, and more particularly to a method for generating a superframe structure using beacon scheduling and transmitting data based on the generated superframe structure.

2. Description of the Related Art

A wireless sensor network is a network implemented to collect remote information in a manner differently than that of an existing network implemented for the communication. Such a wireless sensor network includes sensor nodes for processing and transmitting information collected through sensors and sync-nodes for sending transmission information. Since such a wireless sensor network is formed by a number of sensor nodes, the architecture of the sensor nodes must be simply designed. Moreover, since the sensor nodes may be deployed in wilderness areas, it is necessary to design the sensor nodes with low power consummation for operation with their initial battery for many months or many years. Furthermore, mobility must be taken into consideration in the design of the sensor nodes, so that they can be freely moved. In addition, even if some sensor nodes within the network are damaged, it is necessary to implement the architecture so that the damaged nodes have no influence on the network maintenance.

Meanwhile, the IEEE 802.15 Working Group has been defining the standard of the short-range wireless network. Particularly, since the IEEE 802.15.4 standard defined by the IEEE 802.15 Working Group relates to the implementation of short-range wireless network with low power, it is now attracting attentions as a prominent core technology suitable for the application of a sensor network.

A method for transmitting and receiving data in a wireless sensor network based on the IEEE 802.15.4 standard protocol will be briefly described.

FIG. 1A is a flowchart showing a process for transmitting data from a network device to each of a plurality of coordinators (i.e. a PAN coordinator, a first coordinator, and a second coordinator) in a network using beacons. FIG. 1B is a flowchart showing a process for transmitting data from a coordinator to a network device.

First, the process for transmitting data from the network device to each of the coordinators will be described with reference to FIG. 1A. The coordinator within the wireless sensor network periodically generates a beacon for data transmission, and transmits the generated beacon to data transceivers adjacent to the coordinators. Then, the network device having the received beacon performs synchronization with a superframe structure at a proper point of time and transmits its own data frame to the coordinator by using a slotted CSMA-CA The coordinator sends back an acknowledgment ("ACK") in response to the data reception and reports that it has successfully received the data. Then, the process for transmitting data from the network device to each of the coordinators is terminated.

Next, the process for transmitting data from the coordinator to the network device will be described with reference to FIG. 1B. In this case, the coordinator transmits data by adding information, indicating that it waits to transmit data, to a beacon. After the network device receives the beacon from the coordinator, the network device checks that the coordinator waits to transmit data, and makes a request for data through the slotted CSMA-CA. Then, the coordinator sends back "ACK" in response to the request for the data transmission to the network device, and transmits data through the slotted CSMA-CA. Then, the network device sends back "ACK" in response to the data reception to the coordinator, and reports that it has successfully received data. Then, the process for transmitting data from the coordinator to the network device is terminated.

FIG. 2 is a view showing a tree topology structure of a wireless sensor network based on the IEEE 802.15.4 standard protocol in the prior art.

Referring to FIG. 2, the tree topology structure of the wireless sensor network based on the IEEE 802.15.4 standard protocol includes a PAN coordinator, a first coordinator, a second coordinator, and a network device. The PAN coordinator is disposed as a top layer of the network, and the first coordinator is connected to the PAN coordinator and is a sub-layer of the PAN coordinator. The second coordinator is connected to the first coordinator and is a sub-layer of the first coordinator The network device is connected to each of the coordinators and is a network end device for each of the coordinators.

Further, when the tree topology structure is employed and a beacon is used in the wireless sensor network, synchronization of a superframe through the transmitted beacons transmitted by all of coordinators is maintained. However beacon collision may occur due to beacons simultaneously transmitted from the PAN coordinator and the coordinators within the network. In the end, the coordinators cannot receive intended beacons due to beacon collisions. In order to prevent the beacon collisions, there has been proposed a time division approach and a BOP-based approach.

FIG. 3 is a view showing transmission beacon timing of a coordinator according to a time division approach in the prior art. In the time division approach, for example, an active period including a beacon frame duration and a Superframe Duration (SD) of the PAN coordinator is set to be positioned at an inactive period of the first coordinator for preventing the beacon collisions. However, since the time division approach is a method for randomly positioning an active period and a beacon at an inactive period of a neighboring node, this approach may be efficiently used only if the active period is short and the inactive period is long. In addition, a scope of a selectable inactive period is also reduced according to increase in the number of coordinators in a network. That is, the time division approach has a disadvantage in that it is difficult to avoid beacon collisions according to increases in the distribution density. It also has a disadvantage in that the coordinators receiving the beacons must continually maintain an idle state to receive beacons of neighboring nodes during an inactive period. Therefore, efficiency is remarkably reduced.

FIG. 4 is a view showing beacon transmission timing of a coordinator according to the BOP-based approach in the prior art. The BOP-based approach, which is a contention free scheme, is described with reference to FIG. 4. Each superframe includes a Beacon Only Period (BOP) for beacon transmission. Therefore, each coordinator identifies its own timeslot through the BOP and transmits a beacon only at its assigned timeslot. Further, since each coordinator must receive beacons transmitted from neighboring coordinators, each coordinator waits to receive beacons in a period for beacon transmission by coordinators included in its upper layer. Also, each coordinator must continually wait to receive beacons transmitted from neighboring coordinators during a period subsequent to each coordinator's beacon transmission duration. That is, the coordinator must maintain the active state so that its upper layer coordinators can receive beacons from the starting time of beacon transmission to the end time of the BOP. For example, the first coordinator must be changed into the active state before beacon transmission of the PAN coordinator, and must maintain the changed state (i.e. active state) until the end of the BOP. Therefore, the coordinator must unnecessarily wait to receive beacons even in a period during which a coordinator does not transmit a beacon. Such unnecessary waiting results in wasteful power consumption. Further, if the BOP is separately set within a Superframe Duration (SD), a period for data transmission of the SD may be reduced. Such reduced SD results in the reduction of the network communication efficiency.

In order to solve such problems, there has been requested a plan in which beacons transmitted by coordinators within a network are set to avoid their collisions and consumed power of network administration can be reduced. There has been also requested a plan for increasing network communication efficiency.

SUMMARY OF THE INVENTION

Accordingly, the present invention provides a method for transmitting and receiving data so that it is possible to reduce power consumption of network administration without collision between beacons transmitted and received in a wireless sensor network.

Also, the present invention provides a method for transmitting and receiving data so that it is possible to increase the efficiency of network communication without collision between beacons transmitted and received in a wireless sensor network.

In accordance with an aspect of the present invention, a method in which a plurality of data transceivers included in a wireless sensor network transmit and receive data with devices located in their vicinity includes: (a) defining, by each of the data transceivers, a relation with data transceivers located in their vicinity; (b) assigning a data transceiver for beacon transmission/reception to each slot of a superframe in consideration of the defined relation; (c) generating a superframe structure including a Beacon Only Period (BOP) and a data frame transmission period, in consideration of assigned slots; and (d) broadcasting beacons and data frames in consideration of the superframe structure.

Preferably, in step (d), it is determined if a data transceiver for beacon transmission/reception has been assigned to a timeslot of the BOP, and only a period including a timeslot to which a data transceiver directly connected to a current data transceiver has been assigned is activated.

In step (b), at least one of the plurality of data transceivers is assigned to one slot for beacon transmission/reception.

Step (a) includes the steps of: (a1) identifying the data transceiver serving as a reference transceiver; (a2) identifying at least one first peripheral data transceiver directly connected to the data transceiver serving as the reference transceiver; and (a3) identifying at least one second data transceiver, which is connected through the first peripheral data transceiver to the data transceiver serving as the reference transceiver and is directly connected to the first peripheral data transceiver.

In step (b), the current data transceiver for beacon transmission is assigned to a prior slot among slots to which the first peripheral node and the second peripheral node have not been assigned.

In accordance with another aspect of the present invention, a method in which a plurality of data transceivers within a wireless sensor network transmit and receive data with devices located in their vicinity includes: (A) defining slots for beacon transmission/reception within a superframe; (B) generating a superframe in which a period including slots assigned for beacon transmission/reception is defined as a beacon transmission/reception period and a period from an end of the beacon transmission/reception period is defined as a data frame transmission period; and (C) broadcasting the beacons and the data frames based on the generated superframe.

Step (B) includes the steps of: (B1) checking a number ($BOP_{used}(i)$) indicating the last slot assigned to actually transmit and receive a beacon within a superframe structure to be currently set; (B2) calculating an average value ($BOP_{temp}$) of numbers ($BOP_{used}(i)$) indicating the last slots assigned for the beacon transmission/reception, in a plurality of superframe structures having been recently set; (B3) checking a size of a BOP ($BOP(i-1)$) of a superframe structure set in a previous duration; (B4) calculating a difference value between the size of the BOP ($BOP(i-1)$) of the superframe set in the previous duration and the average value ($BOP_{temp}$); (B5) comparing the difference value with a predetermined threshold ($BOP_{threshold}$); (B6) when the difference value is relatively lower than the predetermined threshold ($BOP_{threshold}$) according to a result of the comparison, setting the size of the BOP of the current superframe ($BOP(i)$) to have the same size as the BOP of the previous duration ($BOP(i-1)$); and (B7) when the difference value is relatively higher than or equal to the threshold according to the result of the comparison, newly setting the size of the BOP of the current superframe ($BOP(i)$) to have the size of the average value ($BOP_{temp}$).

It is preferred that, when the difference value is relatively higher than or equal to the threshold, information for the size of the newly set BOP is included in the beacon.

Step (B1) includes the steps of: checking, by data transceivers, the size of the BOP defined in the current superframe; checking a change in a size of the BOP by using information included in the beacons received from another data transceiver; and making comparison between the size of the BOP defined in the current superframe and the size of the BOP included in the beacon received from data transceiver, and determining a larger size as the size of the BOP.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF THE INVENTION

Now, embodiments of the present invention are described with reference to the accompanying drawings. Further, various specific definitions found in the following description, such as specific values of packet identifications, contents of displayed information, etc., are provided only to provide a general understanding of the present invention, and it would be apparent to those skilled in the art that the present invention can be implemented without such definitions.

The present invention proposes a method for automatically recognizing both a timeslot for its own beacon frame transmission and timeslots to which nodes are to receive beacons transmitted from the neighboring nodes within a BOP of a superframe transmitted by each data transceiver (hereinafter, referred to as a node) deployed in a transmission path, so that only a corresponding timeslot is kept active and a rest of the BOP can be changed into a sleep state for the reduction of energy consumption.

In the present invention, an active state refers to a state in which the data transceiver waits to transmit and receive data, and a sleep state refers to a state in which the data transceiver does not participate in data transmission/reception and is waiting up to an end of the BOP in order to minimize power consumption.

A data transmission/reception method according to one embodiment of the present invention is now described.

First, in order to transmit and receive data frames, each of the devices must perform connection and synchronization between themselves through a wireless channel and form a wireless sensor network by using their assigned addresses. In one embodiment of the present invention, a wireless sensor network may be formed by using a method proposed in the IEEE 802.15.4 protocol or the Zigbee protocol.

Figure 1A:
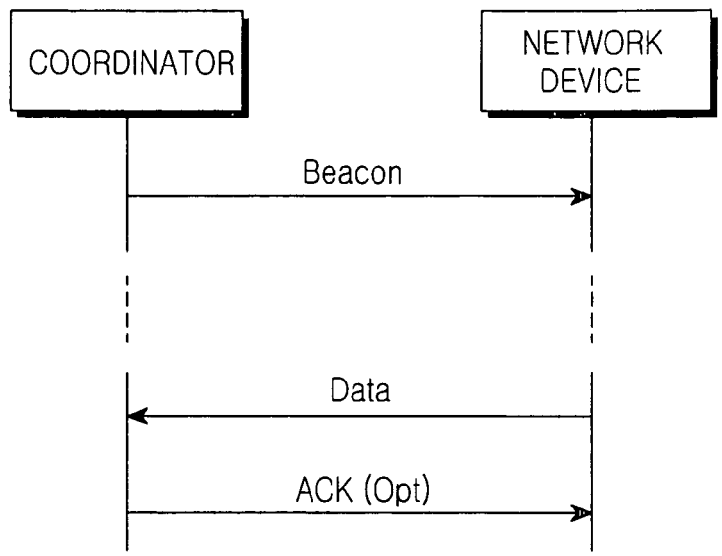
FIG. 1A is a flowchart showing a process for transmitting data from a network device to each of the coordinators in a wireless sensor network based on a conventional IEEE 802.15.4 standard protocol.
Figure 1B:
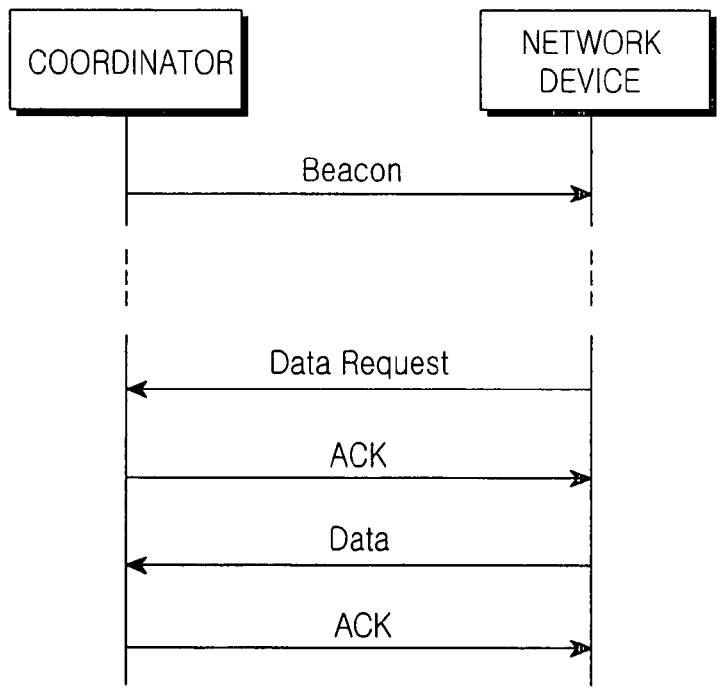
FIG. 1B is a flowchart showing a process for transmitting data from a coordinator to a network device in a wireless sensor network based on a conventional IEEE 802.15.4 standard protocol.
Figure 2:
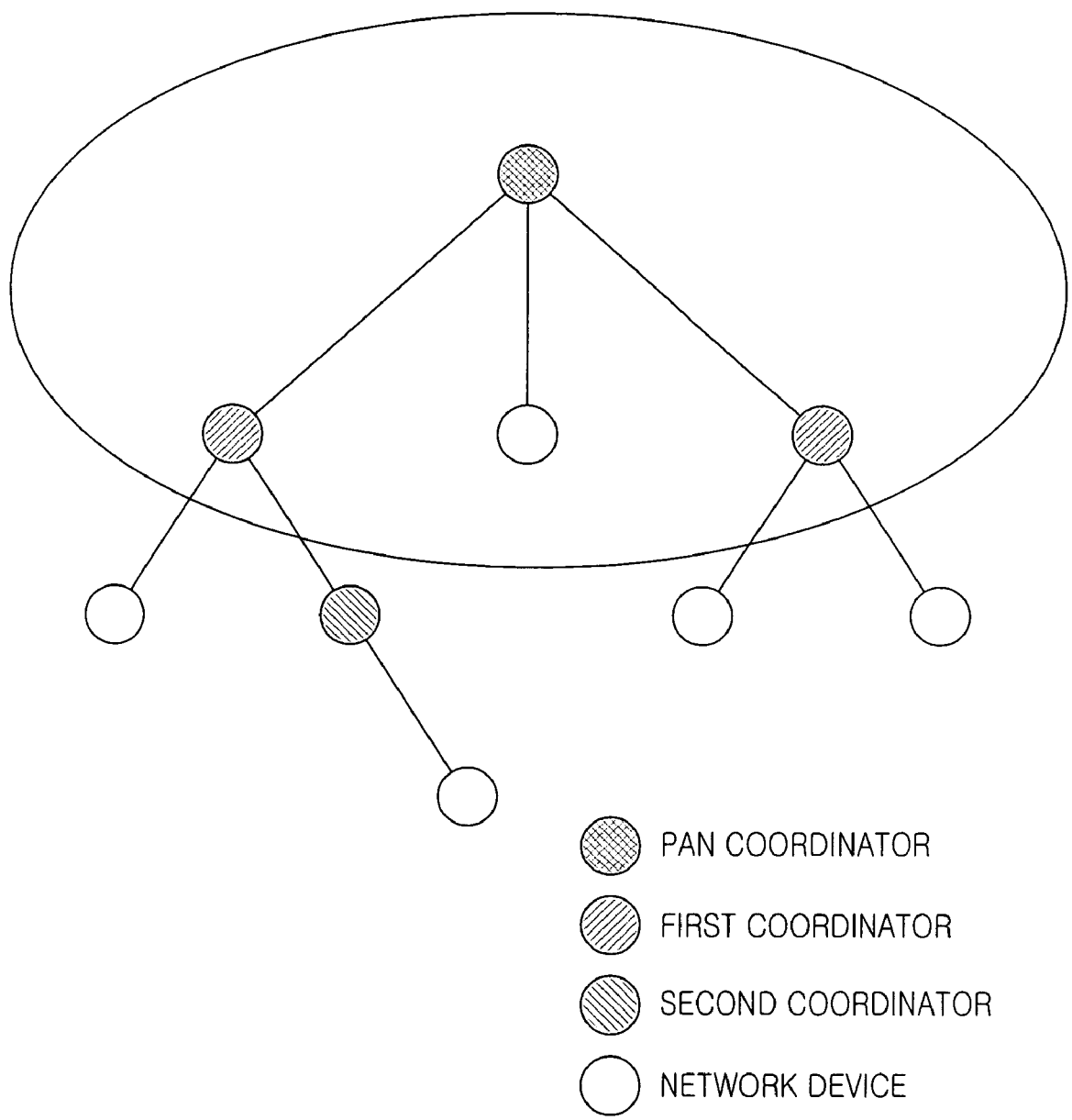
FIG. 2 is a view showing a tree topology structure of a wireless sensor network based on a conventional IEEE 802.15.4 standard protocol.
Figure 3:
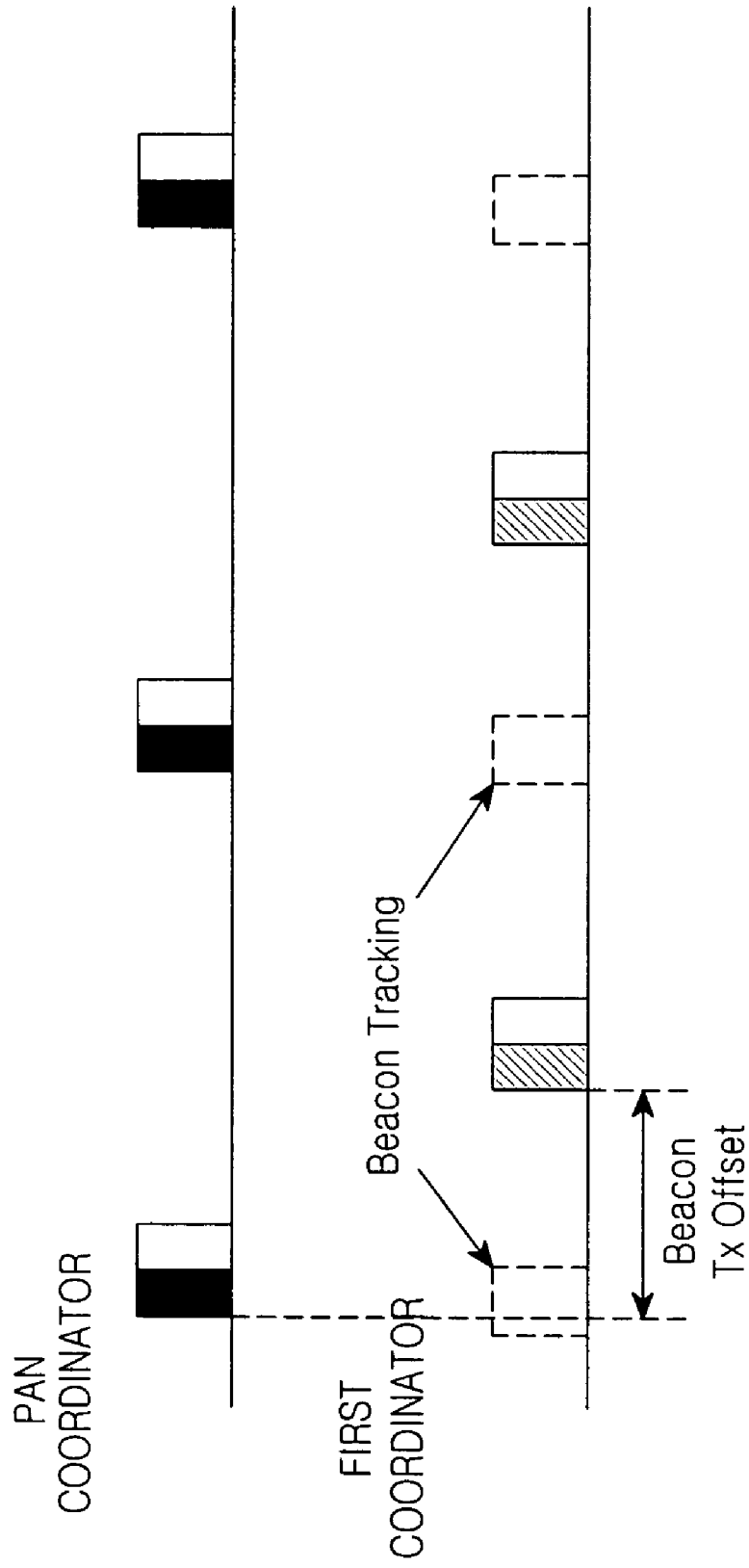
FIG. 3 is a view showing beacon transmission timing of a coordinator based on a conventional time division approach.
Figure 4:
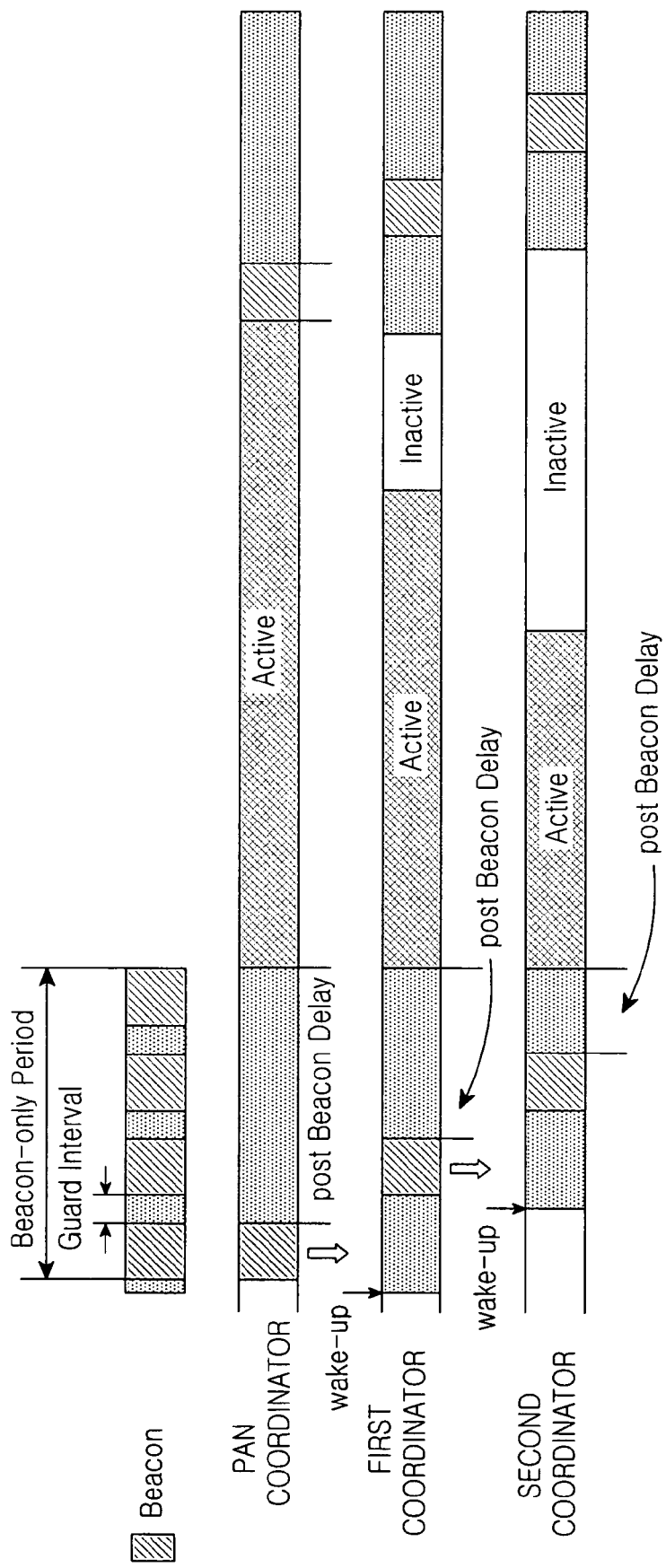
FIG. 4 is a view showing beacon transmission timing of a coordinator based on a conventional BOP-based approach.
Figure 5:
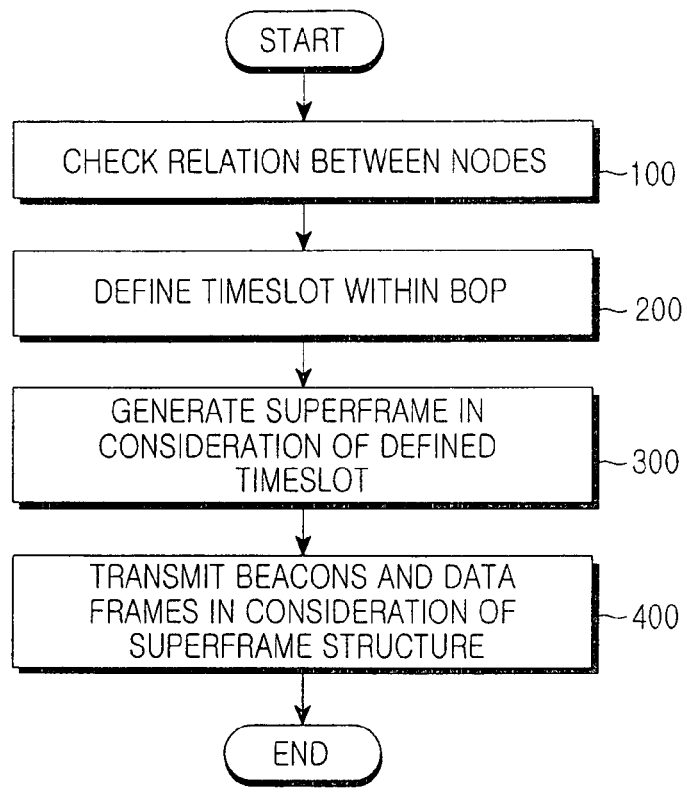
FIG. 5 is a flowchart showing a process of a data transmission/reception method according to one embodiment of the present invention.
Figure 6:
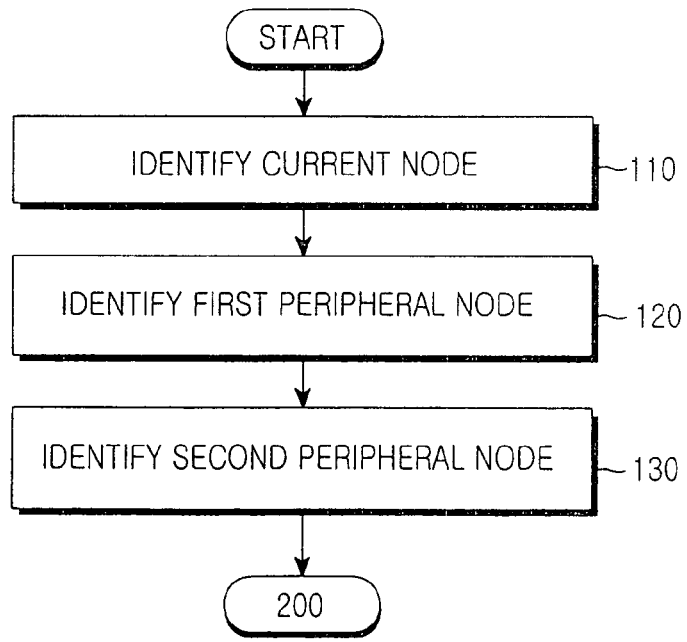
FIG. 6 is a detailed flowchart showing sub-steps of step 100 shown in FIG. 5.
Figure 7:
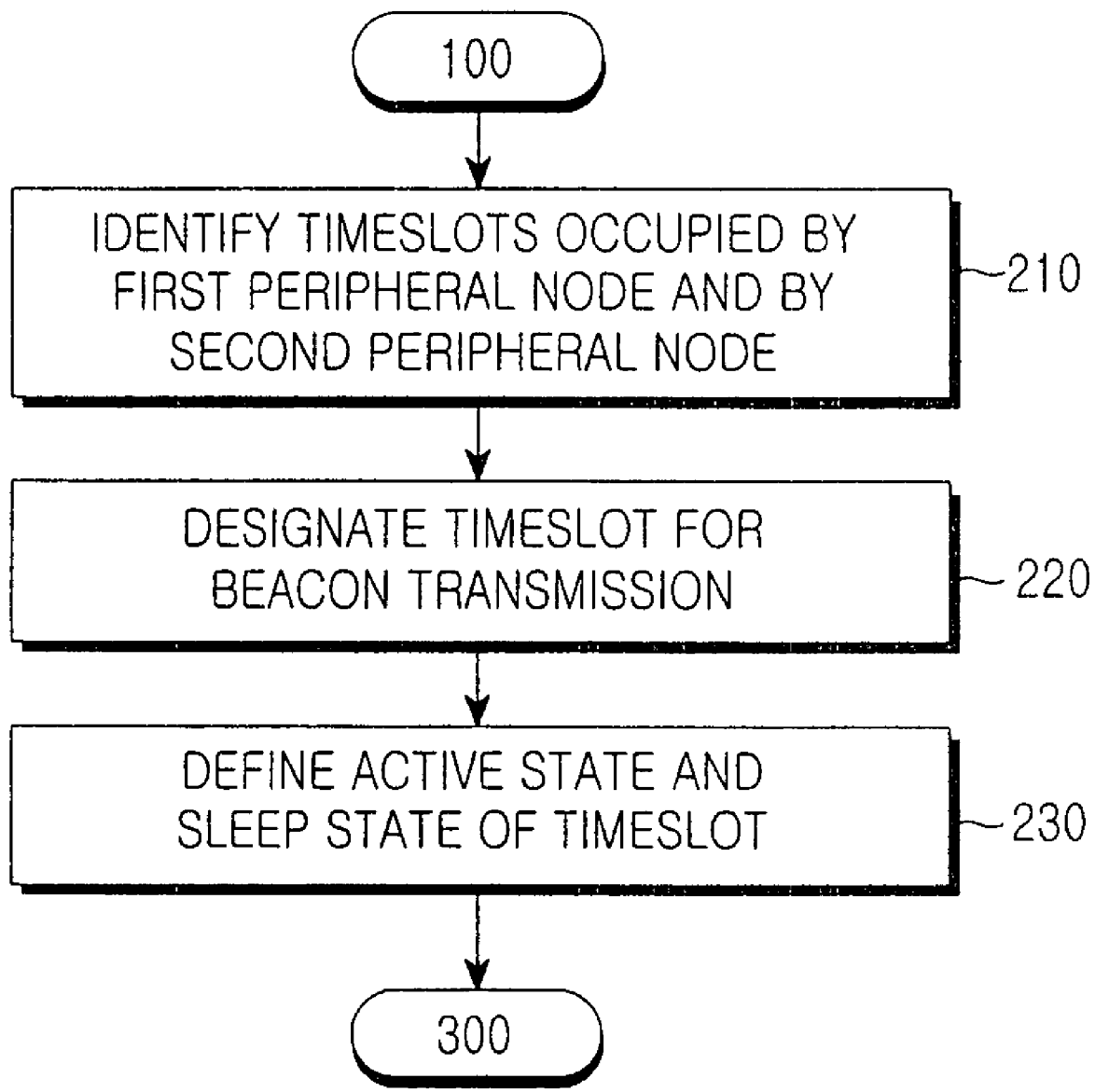
FIG. 7 is a detailed flowchart showing sub-steps of step 200 shown in FIG. 5.

FIG. 5 is a flowchart showing a process of a data transmission/reception method according to one embodiment of the present invention. FIG. 6 is a detailed flowchart showing sub-steps of step 100 shown in FIG. 5. FIG. 7 is a detailed flowchart showing sub-steps of step 200 shown in FIG. 5.

The data transmission/reception method according to one embodiment of the present invention is now described with reference to FIG. 5. First, at an initial setting stage of a network, respective nodes of the wireless sensor network receive data from neighboring nodes, check their own locations, and check the relation with nodes located in their vicinity (step 100). Step 100 of FIG. 5 is now described in more detail with reference to FIG. 6. Step 100 includes a sub-step for identifying its own current node (sub-step 110), a sub-step for identifying first peripheral nodes connected directly to its own current node (sub-step 120), and a sub-step for identifying the second peripheral nodes which are connected directly to the first peripheral nodes and are connected to the current node serving as a reference node via the first peripheral nodes (sub-step 130).

As such, after checking the relation with nodes in step 100, respective nodes define timeslots in the BOP of the superframe in consideration of the relation with peripheral nodes (step 200). In this case, even when a node deployed in a location not directly connected to the current node transmits a beacon simultaneously with the current node, there is no danger of collisions between the two beacons. Therefore, it is possible to assign nodes, deployed in locations not directly connected to the current node, to the same timeslot. That is, it is possible to assign a plurality of nodes to the same timeslot within the scope of no collision occurrence at the time of beacon transmission. Further, it is possible to minimally reduce timeslots to be actually used for beacon transmission/reception among timeslots within the BOP.

Step 200 in which a timeslot for beacon transmission of the current node is defined is described with reference to FIG. 7. When a timeslot to which the first peripheral node or the second peripheral node has been assigned is set to be identical with a timeslot for beacon transmission of the current node, the beacon transmitted by the current node through the identically set timeslot may collide with beacons transmitted either by the first peripheral node or by the second peripheral node. Therefore, before the current node defines a timeslot for its beacon transmission, the current node identifies the first peripheral node and the second peripheral node defined in step 100, and identifies a timeslot to which the first peripheral node or the second peripheral node has been assigned (sub-step 210). Then, the current node avoids the timeslot to which the first peripheral node or the second peripheral node has been assigned, and defines a timeslot for beacon transmission (sub-step 220). Because one timeslot to which a plurality of nodes may be assigned when step 200 is performed, it is preferred that a timeslot for beacon transmission by the current node is the timeslot that can be transmitted first from among the timeslots to which nodes to be avoided (first peripheral node and second peripheral node) have not been assigned. In sub-step 230, a corresponding timeslot is designed to be in the active state so that the current node can transmit its own beacon or can receive beacons from neighboring nodes. That is, the timeslot to which the current node has been assigned and the timeslot to which the first peripheral node has been assigned are defined to be in the active state. At the same time, timeslots, except for both the timeslot to which the current node has been assigned and the timeslot to which the first peripheral node has been assigned are defined to be kept non-active.

In step 300, a superframe structure for data transmission of the current node is generated based on the timeslot defined in the above-described sub-step. In step 300, a timeslot in the BOP of the superframe is defined and a Contention Access Period (CAP) for data frame transmission is defined. Herein, the timeslot includes a timeslot for beacon transmission of the current node and timeslots for beacon reception of the neighboring nodes. Such timeslots are formed based on the definition of the timeslot set in step 200.

After the superframe structure is generated in step 300, the beacon and the data frame are broadcast based on the generated superframe structure in step 400. In this case, based on the definition in sub-step 230, some timeslots for beacon transmission/reception of the current node are kept active, and timeslots not relevant to the beacon transmission/reception of the current node are kept not active. Therefore, since only timeslots required for the beacon transmission/reception of the current node are activated, it is possible to prevent the consumption of unnecessary power. Further, the beacon frame includes information for the superframe structure generated in step 300. Therefore, the nodes receiving the beacon frame set timing for the data transmission/reception in consideration of the superframe structure of neighboring nodes.

The data transmission/reception method will be described by taking an example of a wireless sensor network.

Figure 8:
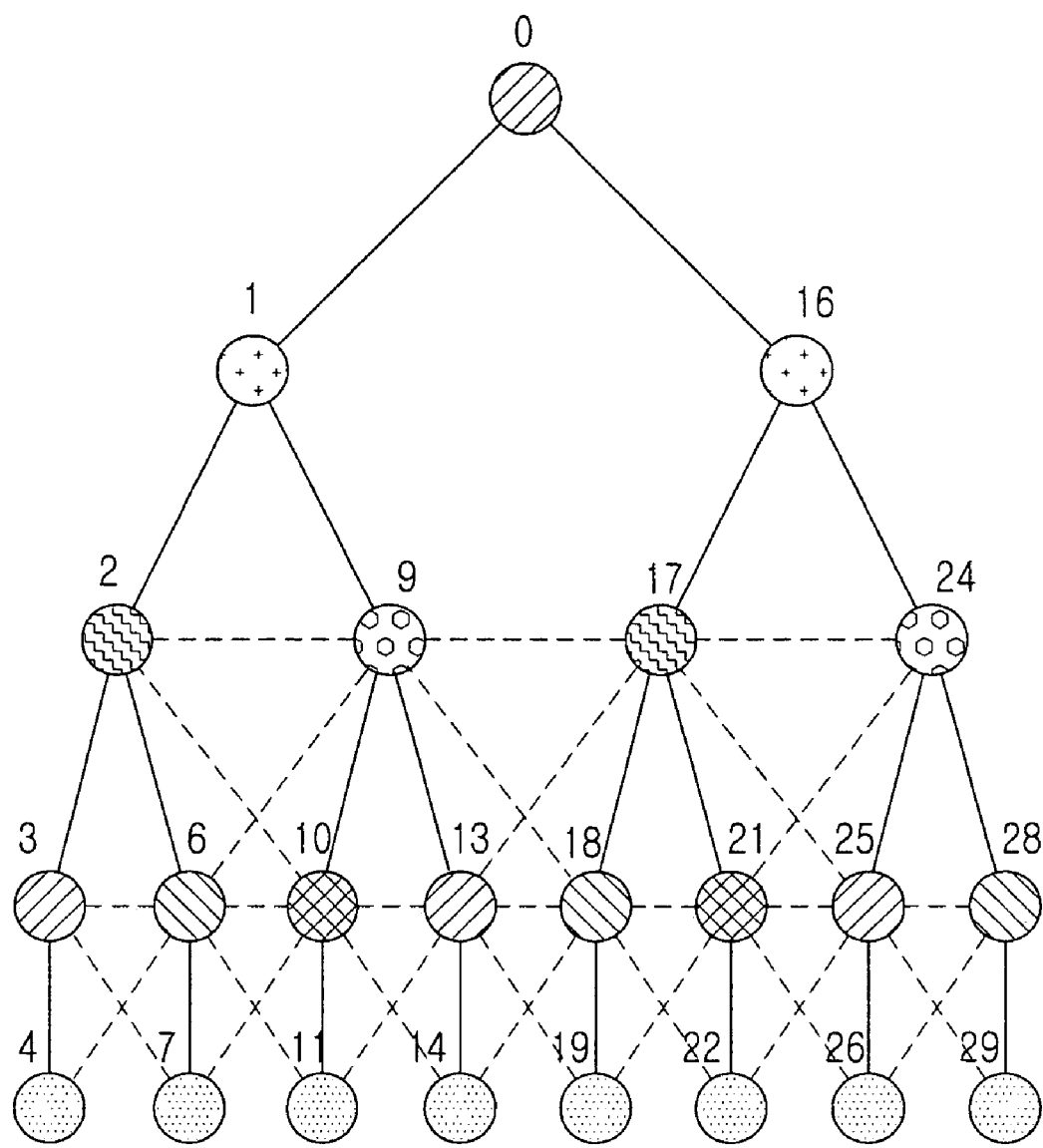
FIG. 8 is view showing a structure of a wireless sensor network according to one embodiment of the present invention.
Figure 9:
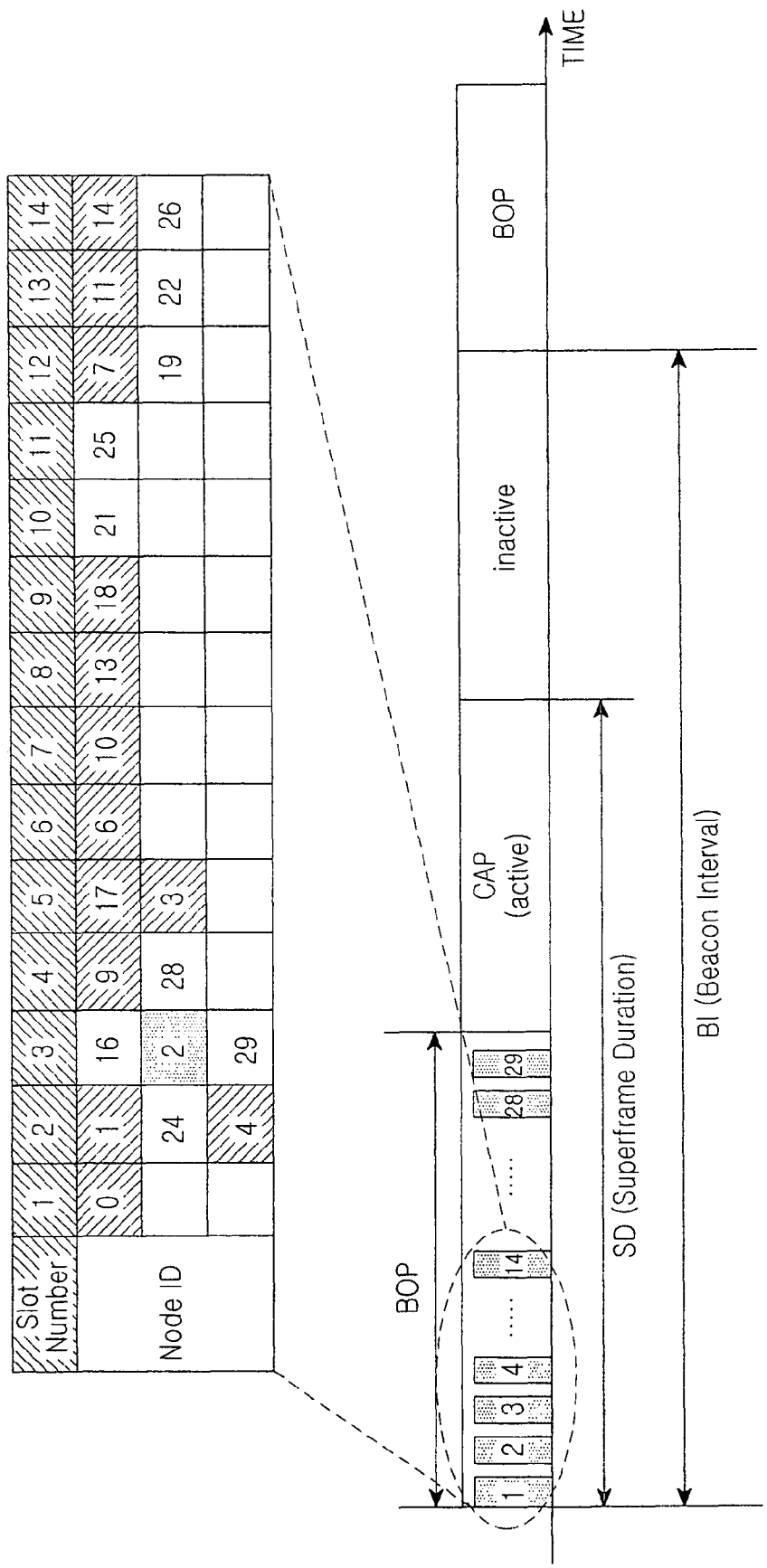
FIG. 9 is a view showing a timeslot to which each node is assigned for beacon transmission through the data transmission/reception method according to one embodiment of the present invention.

FIG. 8 is a view showing a structure of a wireless sensor network employed to describe the data transmission/reception method according to one embodiment of the present invention. FIG. 9 is a view showing a superframe structure generated through the data transmission/reception method according to one embodiment of the present invention.

Referring to FIG. 8, the wireless sensor network described in the embodiment of the present invention is implemented by employing the cluster-tree topology. The wireless sensor network includes a PAN coordinator (a $0^{th}$ node), first coordinators (including a $1^{st}$ node and a $16^{th}$ node), second coordinators (including a $2^{nd}$ node, a $9^{th}$ node, a $17^{th}$ node, and a $24^{th}$ node), third coordinators (including a $3^{rd}$ node, a $6^{th}$ node, a $10^{th}$ node, a $13^{th}$ node, an $18^{th}$ node, a $21^{st}$ node, a $25^{th}$ node, and a $28^{th}$ node), and network devices (including a $4^{th}$ node, a $7^{th}$ node, a $11^{th}$ node, a $14^{th}$ node, a $19^{th}$ node, a $22^{nd}$ node, a $26^{th}$ node, and a $29^{th}$ node). Herein, the first coordinators connected to the PAN coordinator (including the $0^{th}$ node) are sub-layers of the PAN coordinator, and the second coordinators connected to each of the first coordinators (including the $1^{st}$ node and the $16^{th}$ node) are sub-layers of the first coordinators. The third coordinators connected to each of the second coordinators (including the $2^{nd}$ node, the $9^{th}$ node, the $17^{th}$ node, and the $24^{th}$ node) are sub-layers of the second coordinators. The network devices connected to each of the third coordinators (including the $3^{rd}$ node, the $6^{th}$ node, the $10^{th}$ node, the $13^{th}$ node, the $18^{th}$ node, the $21^{st}$ node, the $25^{th}$ node, and the $28^{th}$ node) are sub-layers of the third coordinators.

In the data transmission/reception method according to one embodiment of the present invention, at a network initial setting stage, respective nodes of the wireless sensor network receive data from neighboring nodes, check their own locations, and check the relation with neighboring nodes, in step 100. For example, it is assumed that the current node identified in sub-step 110 is the $2^{nd}$ node, which is one of the second coordinators (including the $2^{nd}$ node, the $9^{th}$ node, the $17^{th}$ node, and the $24^{th}$ node). Then, the first peripheral nodes identified in sub-step 120 are the $1^{st}$ node, the $3^{rd}$ node, the $6^{th}$ node, the $9^{th}$ node, and the $10^{th}$ node which are directly connected to the $2^{nd}$ node or may be connected to the $2^{nd}$ node. Further, second peripheral nodes identified in sub-step 130 may be the $0^{th}$ node, the $4^{th}$ node, the $7^{th}$ node, the $11^{th}$ node, the $13^{th}$ node, the $14^{th}$ node, the $17^{th}$ node, and the $18^{th}$ node, which are directly connected to the first peripheral nodes and may be connected to the current node (i.e. the $2^{nd}$ node) serving as a reference node via the first peripheral nodes.

As such, after the relation with nodes is checked in step 100, each of the nodes defines timeslots in the BOP of the superframe in consideration of the relation with the peripheral nodes (step 200).

TABLE 1

| | |
|---|---|
| Current node | $2^{nd}$ Node |
| $1^{st}$ peripheral node | 1, 3, 6, 9, and 10 |
| Second peripheral node | 0, 4, 7, 11, 13, 14, 17, and 18 |
| Beacon slot to be avoided | $1^{st}$ peripheral node and $2^{nd}$ peripheral node |
| Beacon transmission slot | $3^{rd}$ slot |
| Active slot | $3^{rd}$ slot & slot including $1^{st}$ peripheral node |

Table 1 shows a beacon scheduling table according to one embodiment of the present invention. Referring to Table 1, in sub-step 210, the current node, first peripheral nodes, and second peripheral nodes designated in step 100 are first recorded in the beacon scheduling table, and then nodes to be avoided and timeslots to which the nodes to be avoided have been assigned are identified. In the present embodiment, nodes to be avoided include first peripheral nodes (including the $1^{st}$ node, the $3^{rd}$ node, the $6^{th}$ node, the $9^{th}$ node, and the $10^{th}$ node) and second peripheral nodes (including the $0^{th}$ node, the $4^{th}$ node, the $7^{th}$ node, the $11^{th}$ node, the $13^{th}$ node, the $14^{th}$ node, the $17^{th}$ node, and the $18^{th}$ node). Referring to FIG. 9, timeslots occupied by the nodes to be avoided include a $1^{st}$ timeslot, a $2^{nd}$ timeslot, a $4^{th}$ timeslot, a $5^{th}$ timeslot, a $6^{th}$ timeslot, a $7^{th}$ timeslot, an $8^{th}$ timeslot, a $9^{th}$ timeslot, a $12^{th}$ timeslot, a $13^{th}$ timeslot, and a $14^{th}$ timeslot.

In sub-step 220, timeslots (including a $3^{rd}$ timeslot, a $10^{th}$ timeslot, and an $11^{th}$ timeslot) to which the nodes to be avoided are not assigned are checked, and then the $3^{rd}$ timeslot, which can be transmitted first among the timeslots to which nodes to be avoided have not been assigned, is set as the timeslot for the beacon transmission of the current node.

In sub-step 230, the $2^{nd}$ timeslot, the $4^{th}$ timeslot, the $5^{th}$ timeslot, the $6^{th}$ timeslot, and the $7^{th}$ timeslot waiting to receive beacons from the first peripheral nodes (including the $1^{st}$ node, the $3^{rd}$ node, the $6^{th}$ node, the $9^{th}$ node, and the $10^{th}$ node) and the $3^{rd}$ timeslot for beacon transmission of the $2^{nd}$ node are set to be in an active state. In addition, the $0^{th}$ timeslot, and the $8^{th}$ timeslot to the $29^{th}$ timeslot (the last timeslot), which are the remaining timeslots, are set to be in the sleep (not active) state.

Figure 10:
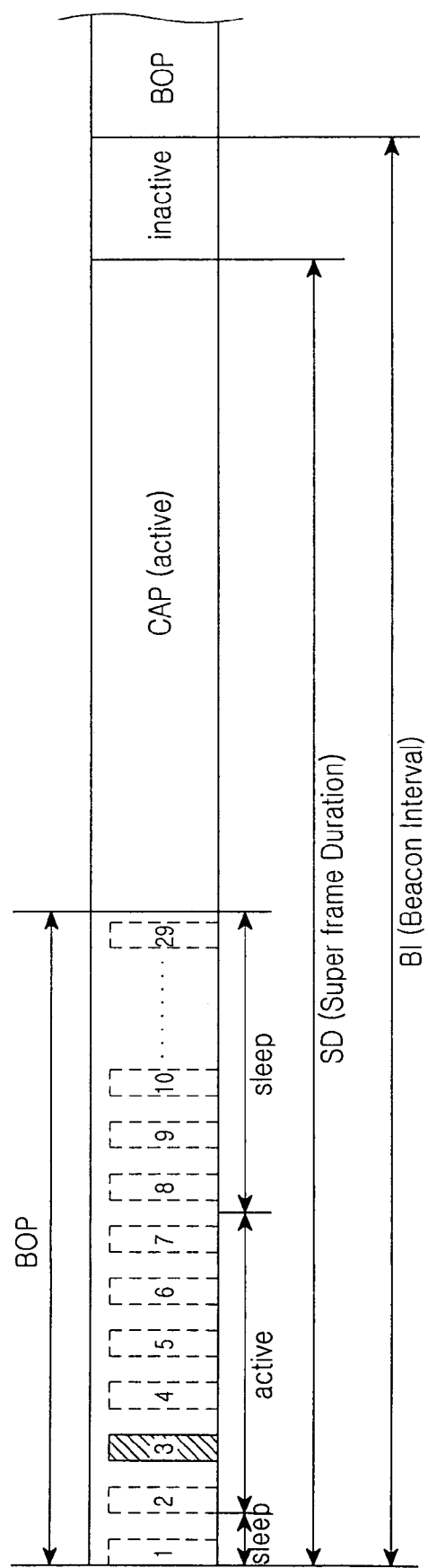
FIG. 10 is a view showing a superframe structure generated by a specific node through the data transmission/reception method according to one embodiment of the present invention.

In step 300, the superframe structure including both the timeslot to which the current node has been assigned and timeslots to be kept active is generated based on the timeslot defined in step 200 (see FIG. 10). In step 400, beacons and data frames are broadcast in consideration of the active period and the sleep period based on the generated superframe structure. In this case, the broadcast beacon frames include information indicating the superframe structure.

As described above, according to the data transmission/reception method of one aspect of the present invention, nodes deployed in locations of no beacon collision occurrence are simultaneously assigned to timeslots for beacon transmission, so that it is possible to achieve reduction in required timeslot numbers and prevention of beacon collision. In addition, only timeslots for beacon transmission/reception are kept active and remaining timeslots are kept not active by each of the nodes, so that it is possible to reduce consumption power for beacon transmission.

Meanwhile, the SD is fixed by a value of the Superframe Order (SO). Therefore, it is preferred that the length of the BOP is minimized and the length of a data frame transmission period (e.g. CAP) is increased for high efficiency of data communication. However, due to the characteristics of the sensor network, when frequent changes occur within a network, the number of timeslots used in the BOP also frequently changes. Moreover, the length of the CAP is also suddenly changed according to the sudden change of the BOP length. Therefore, it is preferred that high data transmission efficiency and minimized energy consumption are achieved through a mechanism for gradually changing the CAP and optimizing the length of the BOP.

Another embodiment of the present invention proposes a data transmission/reception method for gradually changing the CAP and optimizing the size of the BOP.

At an initial stage of network setting, the size of the BOP is set to have a sufficient reserved period, in consideration of the number of extended nodes. Therefore, in order to efficiently transmit data frames after the initial stage of the network setting, the size of the BOP must be reduced based on the reserved period. However, it is preferred that, since repeated timeslots may be lost due to the movement and vanishing of a sensor node or slight increase in the size of the BOP may occur, the size of the BOP is set so that frequent change in the size of the BOP does not occur.

The above-described embodiment describes a case of the superframe, including that timeslots for beacon transmission/reception are active and the remaining timeslots except for the timeslots for beacon transmission/reception are kept sleepy, as an example. Alternatively, instead of maintaining the other timeslots except for the timeslots for the beacon transmission/reception in the sleep state, it is also possible that, when timeslots assigned for beacon transmission/reception (i.e. an active period within the BOP) are terminated, the BOP is terminated and a CAP is defined for data frame transmission.

Figure 11:
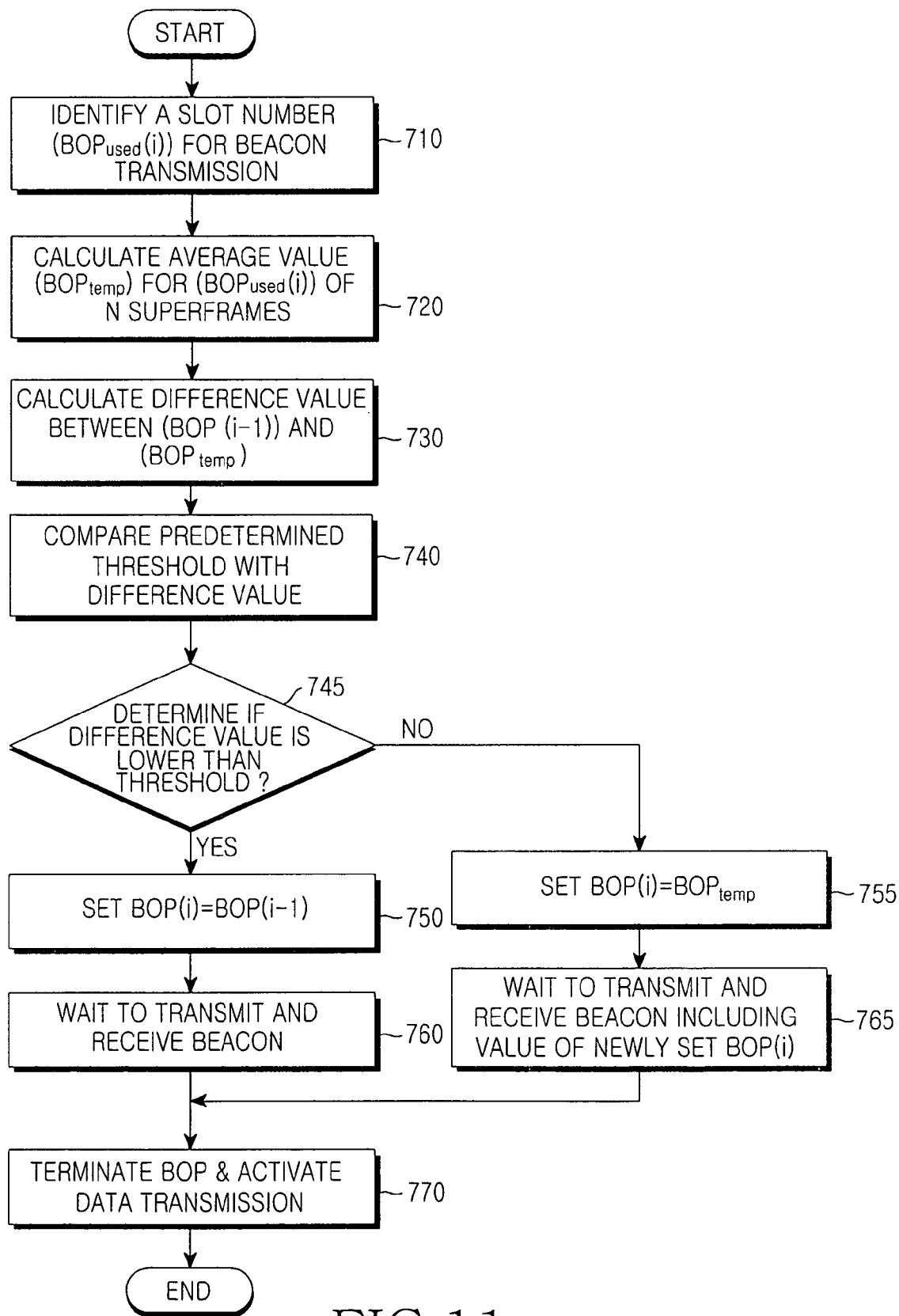
FIG. 11 is a flowchart showing a process of a data transmission/reception method according to another embodiment of the present invention.

FIG. 11 is a flowchart showing a process of a data transmission/reception method according to another embodiment of the present invention. The data transmission/reception method according to another embodiment includes step 710, in which a number ($BOP_{used}(i)$) indicating order of the last slot is identified among from timeslots used to actually transmit and receive beacons within the BOP. That is, since nodes are assigned to each timeslot for beacon transmission/reception in consideration of a wireless network condition, each timeslot occupied by nodes for beacon transmission/reception is checked and thus the number indicating the order of the last timeslot occupied by a node is identified.

In the data transmission/reception method according to another embodiment of the present invention, there is proposed an alternative plan for activating only a timeslot participating in beacon transmission/reception. The data transmission/reception method according to another embodiment of the present invention includes the same procedures as steps 100 and 200, as described in one embodiment of the present invention, in which relation with nodes within the network is checked and timeslots within the BOP in the superframe are defined. Therefore, in step 710, it is possible to identify the sequence number ($BOP_{used}(i)$) of the last slot, by identifying timeslots defined in steps 100 and 200. For example, referring to one embodiment, the last slot identified in step 710 may be the 14$^{th}$ timeslot to which the 14$^{th}$ node and the 26$^{th}$ node are assigned.

Although step 710 is performed by using the timeslots defined in steps 100 and 200, the scope of the present invention is not limited thereto. In step 710, it is possible for the sequence number of the last slot ($BOP_{used}(i)$) to be identified among timeslots used for the beacon transmission/reception.

In the present invention, the sequence number of the last slot (hereinafter, referred to as "last slot number") refers to the number of a slot finally assigned for beacon transmission within the BOP from among timeslots having virtual sequence numbers according to a time sequence within the BOP.

Preferably, in step 710, the last slot number defined in the superframe transmitted by the current node and the sequence numbers of the last slots defined in the superframe received from the neighboring nodes are identified in order to determine the last slot number ($BOP_{used}(i)$). That is, it is possible to compare the last slot number defined in the superframe transmitted by the current node with the numbers of the last slots defined in the superframe received from the neighboring nodes, and then determine a sequence number of the slot having a larger value as the last slot number ($BOP_{used}(i)$).

In step 720, each of the nodes stores the last slot number ($BOP_{used}(i)$) used in n superframes having been recently transmitted, and then calculates an average value ($BOP_{temp}$) of the last slot numbers for the "n" superframe. Herein, the average value ($BOP_{temp}$) can be defined by equation (1).

$$BOP_{temp} = \frac{1}{n}\sum_{k=1}^{n} BOP_{used}(i-k) \qquad (1)$$

In equation (1), n is a number of superframes used for calculating the average value and size of superframe can be determined by considering capacity of memory for storing data generated during calculation process.

After the average value ($BOP_{temp}$) is calculated in step 720, a difference value between the average value ($BOP_{temp}$) and the last slot number in the BOP of the superframe transmitted in a previous duration ($BOP(i-1)$) is calculated in step 730. In step 740, the calculated difference value is compared with a predetermined threshold ($BOP_{threshold}$). As a result of the comparison in step 740, when the difference value is lower than a threshold ($BOP_{threshold}$), as shown by equation (2) below, the size of the BOP of the current superframe ($BOP(i)$) is set to have the same size as the BOP of the superframe transmitted in a previous duration ($BOP(i-1)$) in step 750.

$$|BOP_{temp}-BOP(i-1)|<BOP_{threshold}, BOP(i)=BOP(i-1) \qquad (2)$$

As a result of the performance in step 750, the BOP for beacon transmission/reception is set to have the same size as the ($BOP(i)$) of the current superframe, and thus a superframe structure is generated in step 760.

Meanwhile, as the result of the comparison in step 740, when the difference value is higher than or equal to the threshold, as shown by equation (3) below, the size of the BOP of the current superframe ($BOP(i)$) is set to have the average value ($BOP_{temp}$) in step 755.

$$|BOP_{temp}-BOP(i-1)|\geq BOP_{threshold}, BOP(i)=BOP_{temp} \qquad (3)$$

As a result of the performance in step 755, the BOP for beacon transmission/reception is set to have the same size as the BOP of the current superframe ($BOP(i)$) and thus a superframe structure is generated in step 765. In this case, the generated superframe including beacons contains the size of newly updated BOP ($BOP(i)$) so that nodes receiving beacons can recognize a change of the BOP for beacon transmission/reception and synchronize timing of data transmission/reception in reflection of the recognition.

Finally, based on the superframe generated either in step 760 or in step 765, beacons and data frame are broadcast to be delivered to peripheral nodes in step 770.

As described above, in a data transmission/reception method according to another embodiment of the present invention, by setting a proper size of a BOP according to a network environment (i.e. the node numbers within a network), it is possible to not only increase data transmission efficiency, but also to reduce consumption power of data transmission/reception.

Although it has been assumed in the above description of embodiments of the present invention that a wireless sensor network is formed by using a method proposed in the IEEE 802.15.4 protocol or in the Zigbee protocol, the present invention is not limited to that assumption and implementation of a wireless sensor network for data transmission/reception is sufficient for application of the present invention.

The above-described methods according to the present invention can be realized in hardware or as software or computer code that can be stored in a recording medium such as a CD ROM, an RAM, a floppy disk, a hard disk, or a magneto-optical disk or downloaded over a network, so that the methods described herein can be rendered in such software using a general purpose computer, or a special processor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A method in which a plurality of data transceivers included in a wireless sensor network transmit and receive data with devices located in their vicinity, the method comprising:
    (a) defining, by each of the data transceivers, a relation with data transceivers located in their vicinity;
    (b) assigning a data transceiver for beacon transmission/reception to each slot of a superframe in consideration of the defined relation;
    (c) generating a superframe structure including a Beacon Only Period (BOP) and a data frame transmission period, in consideration of assigned slots, wherein a size of a BOP in a current superframe is determined based on one of a size of BOPs in prior superframes and an average value of BOP values used in a plurality of recently transmitted superframes; and
    (d) broadcasting beacons and data frames in consideration of the superframe structure.

2. The method as claimed in claim 1, wherein, in step (d), it is checked if a data transceiver for beacon transmission/reception has been assigned to a timeslot of the BOP, and only a period including a timeslot to which a data transceiver directly connected to a current data transceiver has been assigned is activated.

3. The method as claimed in claim 1, wherein, in step (b), at least one of the plurality of data transceivers is assigned to one slot for beacon transmission/reception.

4. The method as claimed in claim 1, wherein step (a) comprises:
    (a1) identifying the data transceiver serving as a reference transceiver;
    (a2) identifying at least one first peripheral data transceiver directly connected to the data transceiver serving as the reference transceiver; and
    (a3) identifying at least one second data transceiver, which is connected through the first peripheral data transceiver to the data transceiver serving as the reference transceiver and is directly connected to the first peripheral data transceiver.

5. The method as claimed in claim 4, wherein, in step (b), the current data transceiver for beacon transmission is assigned to a prior slot among slots to which the first peripheral node and the second peripheral node have not been assigned.

6. The method as claimed in one of claims 1, wherein steps (a), (b), (c), and (d) are successively repeated.

7. The method as claimed in claim 1, wherein step (c) further comprises:
    (c1) identifying a slot to which the data transceiver is assigned for beacon transmission/reception; and
    (c2) setting the BOP in consideration of a period including the last slot.

8. The method as claimed in claim 7, wherein, in step (c2), a period subsequent to an end of the BOP is defined for the data frame transmission.

9. The method as claimed in claim 7, wherein step (c1) comprises:
    (c11) checking a number ($BOP_{used}(i)$) indicating the last slot assigned to actually transmit and receive a beacon within a superframe structure to be currently set;
    (c12) calculating the average value ($BOP_{temp}$) of numbers ($BOP_{used}(i)$) indicating the last slots assigned for the beacon transmission/reception within a plurality of superframe structures having been recently set;
    (c13) checking the size of the BOP of a superframe structure set in a previous duration ($BOP(i-1)$);
    (c14) calculating a difference value between the size of the BOP of the superframe set in the previous duration ($BOP(i-1)$) and the average value ($BOP_{temp}$);
    (c15) comparing the difference value with a predetermined threshold ($BOP_{threshold}$);
    (c16) when the difference value is lower than the threshold ($BOP_{threshold}$), setting the size of the BOP of a current superframe ($BOP(i)$) to have the same size as the BOP of the superframe set at the previous duration ($BOP(i-1)$); and
    (c17) when the difference value is higher than or equal to the threshold setting the size of the BOP of the current superframe ($BOP(i)$) to have the size of the average value ($BOP_{temp}$).

10. The method as claimed in claim 9, wherein, when the difference value is higher than or equal to the threshold, information for the size of the set BOP is included in the beacon.

11. The method as claimed in claim 1 wherein step (c1) comprises:
    checking, by the data transceivers, the size of the BOP defined in the current superframe;
    checking a change in the size of a BOP by using information included in the beacon received from another data transceiver; and
    making a comparison between the size of the BOP defined in the current superframe and the size of the BOP included in the beacon received from the data transceiver, and determining the larger size as a size of the BOP based on the comparison.

12. A method in which a plurality of data transceivers within a wireless sensor network transmit and receive data with devices located in their vicinity, the method comprising:
    (A) defining slots for beacon transmission/reception within a superframe;

(B) generating a superframe in which a period including slots assigned for beacon transmission/reception is defined as a beacon transmission/reception period (BOP) and a period from an end of the beacon transmission/reception period is defined as a data frame transmission period, wherein a size of a BOP in a current superframe is determined based on one of a size of BOPs in prior superframes and an average value of BOP values used in a plurality of recently transmitted superframes; and (C) broadcasting the beacons and the data frames based on the generated superframe.

13. The method as claimed in claim 12, wherein step (B) comprises:

(B1) checking a number ($BOP_{used}(i)$) indicating the last slot assigned to actually transmit and receive a beacon within a superframe structure to be currently set;

(B2) calculating the average value ($BOP_{temp}$) of numbers ($BOP_{used}(i)$) indicating the last slots assigned for the beacon transmission/reception, in a plurality of superframe structures having been recently set;

(B3) checking the size of a BOP ($BOP(i-1)$) of a superframe structure set in a previous duration;

(B4) calculating a difference value between the size of the BOP ($BOP(i-1)$) of the superframe set in the previous duration and the average value ($BOP_{temp}$);

(B5) comparing the difference value with a predetermined threshold ($BOP_{threshold}$);

(B6) when the difference value is relatively lower than the predetermined threshold ($BOP_{threshold}$) according to a result of the comparison, setting the size of the BOP of the current superframe ($BOP(i)$) to have the same size as the BOP of the previous duration ($BOP(i-1)$); and (B7) when the difference value is relatively higher than or equal to the threshold according to the result of the comparison, newly setting the size of the BOP of the current superframe ($BOP(i)$) to have the size of the average value ($BOP_{temp}$).

14. The method as claimed in claim 13, wherein, when the difference value is relatively higher than or equal to the threshold, information for the size of the newly set BOP is included in the beacon.

15. The method as claimed in claim 12, wherein step (B1) comprises:

checking, by data transceivers, the size of the BOP defined in the current superframe;

checking a change in a size of the BOP by using information included in the beacons received from another data transceiver; and making comparison between the size of the BOP defined in the current superframe and the size of the BOP included in the beacon received from data transceiver, and determining a larger size as the size of the BOP.

16. An apparatus in which a plurality of data transceivers within a wireless sensor network transmit and receive data with devices located in their vicinity, the apparatus comprising:

a processor in communication with a memory, the memory including code which when accessed by the processor causes the processor to execute the steps of:

(A) defining slots for beacon transmission/reception within a superframe;

(B) generating a superframe in which a period including slots assigned for beacon transmission/reception is defined as a beacon transmission/reception period (BOP) and a period from an end of the beacon transmission/reception period is defined as a data frame transmission period, wherein a size of a BOP in a current superframe is determined based on-one of a size of BOPs in prior superframes and an average value of BOP values used in a plurality of recently transmitted superframes, in which a period including slots assigned for beacon transmission/reception is defined as a beacon transmission/reception period and a period from an end of the beacon transmission/reception period is defined as a data frame transmission period; and (C) broadcasting the beacons and the data frames based on the generated superframe.

17. The apparatus as claimed in claim 16, wherein step (B) comprises:

(B1) checking a number ($BOP_{used}(i)$) indicating the last slot assigned to actually transmit and receive a beacon within a superframe structure to be currently set;

(B2) calculating the average value ($BOP_{temp}$) of numbers ($BOP_{used}(i)$) indicating the last slots assigned for the beacon transmission/reception, in a plurality of superframe structures having been recently set;

(B3) checking the size of a BOP ($BOP(i-1)$) of a superframe structure set in a previous duration;

(B4) calculating a difference value between the size of the BOP ($BOP(i-1)$) of the superframe set in the previous duration and the average value ($BOP_{temp}$);

(B5) comparing the difference value with a predetermined threshold ($BOP_{threshold}$);

(B6) when the difference value is relatively lower than the predetermined threshold ($BOP_{threshold}$) according to a result of the comparison, setting the size of the BOP of the current superframe ($BOP(i)$) to have the same size as the BOP of the previous duration ($BOP(i-1)$); and (B7) when the difference value is relatively higher than or equal to the threshold according to the result of the comparison, newly setting the size of the BOP of the current superframe ($BOP(i)$) to have the size of the average value ($BOP_{temp}$).

18. The apparatus as claimed in claim 17, wherein, when the difference value is higher than or equal to the threshold, information for the size of the newly set BOP is included in the beacon.

19. The apparatus as claimed in claim 16, wherein step (B1) comprises:

checking, by data transceivers, the size of the BOP defined in the current superframe;

checking a change in a size of the BOP by using information included in the beacons received from another data transceiver; and making comparison between the size of the BOP defined in the current superframe and the size of the BOP included in the beacon received from data transceiver, and determining a larger size as the size of the BOP.

20. The method as claimed in claim 1, wherein the size of a BOP in the current superframe is determined based on an average value of BOPs in prior superframes and on a size of a BOP in an immediately prior superframe.

* * * * *